(12) United States Patent
Chang et al.

(10) Patent No.: US 12,077,993 B2
(45) Date of Patent: Sep. 3, 2024

(54) DETACHABLE ELECTRONIC DEVICE AND DOCK THEREOF

(71) Applicant: PEGATRON CORPORATION, Taipei (TW)

(72) Inventors: Chun-Fu Chang, Taipei (TW); Yi-Chun Tang, Taipei (TW); Peng-Chia Huang, Taipei (TW); Hui-Chen Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 321 days.

(21) Appl. No.: 17/826,399

(22) Filed: May 27, 2022

(65) Prior Publication Data
US 2023/0026242 A1 Jan. 26, 2023

(30) Foreign Application Priority Data

Jul. 14, 2021 (TW) .................................. 110125798

(51) Int. Cl.
*E05B 73/00* (2006.01)
*G06F 1/16* (2006.01)

(52) U.S. Cl.
CPC ........ *E05B 73/0082* (2013.01); *G06F 1/1632* (2013.01); *G06F 1/1654* (2013.01); *G06F 1/1669* (2013.01); *G06F 1/1681* (2013.01); *G06F 1/1675* (2013.01)

(58) Field of Classification Search
CPC ............. E05B 73/0082; E05B 65/0067; G06F 1/1632; G06F 1/1654; G06F 1/1669; G06F 1/1675
See application file for complete search history.

(56) References Cited

U.S. PATENT DOCUMENTS

| 6,744,627 B2 | 6/2004 | Won et al. | |
|---|---|---|---|
| 8,259,438 B2* | 9/2012 | Hsiu | G06F 1/1671 |
| | | | 361/679.01 |
| 9,141,146 B2* | 9/2015 | Ke | G06F 1/1679 |
| 9,582,037 B2* | 2/2017 | Kaneko | G06F 1/1632 |
| 10,007,298 B2* | 6/2018 | Shibayama | H05K 7/20272 |

(Continued)

FOREIGN PATENT DOCUMENTS

| CN | 110325944 A | 10/2019 |
|---|---|---|
| TW | I224491 B | 11/2004 |

(Continued)

*Primary Examiner* — Nidhi Thaker

(74) *Attorney, Agent, or Firm* — Li & Cai Intellectual Property (USA) Office

(57) ABSTRACT

A detachable electronic device and a dock thereof are provided. The detachable electronic device includes a first machine body, a second machine body, and a dock. The dock includes a pair of fixing brackets, a pair of rotating axles, a latch module disposed between the rotating axles, a lock base, and a linkage kit. The latch module can be arranged in a locked state or an unlocked state to lock or release the second machine body. The lock base is slidably disposed on one of the fixing brackets. The linkage kit has one end fixed to the latch module, and the other another end slidably sleeved onto the lock base. When an anti-theft lock is locked to the lock base, the lock base restricts a displacement of the linkage kit, and the linkage kit restricts the latch module to the locked state.

8 Claims, 13 Drawing Sheets

(56) References Cited

U.S. PATENT DOCUMENTS

| | | | |
|---|---|---|---|
| 10,067,533 B1* | 9/2018 | Powell | G06F 1/1679 |
| 10,788,857 B2* | 9/2020 | Huang | E05B 73/0082 |
| 10,791,638 B2* | 9/2020 | Wu | H05K 5/0221 |
| 2005/0028571 A1* | 2/2005 | Merrem | E05B 73/0082 |
| | | | 70/58 |
| 2006/0082965 A1* | 4/2006 | Walker | E05B 73/0082 |
| | | | 361/679.41 |
| 2009/0140618 A1* | 6/2009 | Kodaira | G06F 1/1635 |
| | | | 312/223.6 |
| 2011/0116862 A1 | 5/2011 | Lo et al. | |
| 2014/0355196 A1* | 12/2014 | Hashimoto | G06F 1/1632 |
| | | | 248/346.03 |
| 2018/0046218 A1* | 2/2018 | Iwamoto | E05B 73/0082 |
| 2019/0360241 A1 | 11/2019 | Mori et al. | |
| 2019/0369666 A1* | 12/2019 | Mori | G06F 1/1632 |

FOREIGN PATENT DOCUMENTS

| | | | | |
|---|---|---|---|---|
| TW | 201118229 A1 | 6/2011 | | |
| TW | I739698 B | 9/2021 | | |
| WO | WO-2015076848 A1 * | 5/2015 | | E05B 17/2023 |

* cited by examiner

DETACHABLE ELECTRONIC DEVICE AND DOCK THEREOF

CROSS-REFERENCE TO RELATED PATENT APPLICATION

This application claims the benefit of priority to Taiwan Patent Application No. 110125798, filed on Jul. 14, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

BACKGROUND

Technology Field

The present disclosure relates to a detachable electronic device, and more particularly to an electronic device having a first machine body and a second machine body that is detachably connected to a dock of the first machine body.

Description of the Related Art

Currently, an external keyboard can be used for inputting contents into a tablet computer in a more convenient manner. The external keyboard has a dock. The tablet computer can be detachably fixed to the dock, and electrically connected to the external keyboard.

An anti-theft device for tablet computers commonly seen at shopping centers is usually attached to the tablet computer. In such manner, the external keyboard cannot be protected from theft at the same time. However, if an additional anti-theft lock is installed to secure the external keyboard, the cost will inevitably increase.

Therefore, how to improve an anti-theft function of a detachable electronic device through an improvement in structural design and overcome the above-mentioned deficiency has become one of the important issues to be solved in the related art.

SUMMARY OF THE DISCLOSURE

In response to the above-referenced technical inadequacy, the present disclosure provides a detachable electronic device, which is anti-theft for both of a first machine body and a second machine body by use of only one anti-theft lock. The detachable electronic device also provides a movement space for a lock core of the anti-theft lock, so as to prevent the anti-theft lock from deformation caused by being pushed by a dock.

In one aspect, the present disclosure provides a dock configured to dock a first machine body with a second machine body. The dock includes a pair of fixing brackets, a pair of rotating axles, a latch module, a lock base, and a linkage kit. Each one of the pair of fixing brackets has a bottom portion, and the bottom portions of the pair of fixing brackets are fixed to two respective sides of the first machine body. The pair of rotating axles is mounted on the pair of fixing brackets. The pair of rotating axles is rotatable relative to the pair of fixing brackets about an axial direction. The latch module is disposed between the pair of rotating axles. The latch module is configured to lock the second machine body in a locked state, or release the second machine body in an unlocked state. The latch module is able to rotate with respect to the pair of rotating axles. The lock base is slidably disposed on one of the pair of fixing brackets along the axial direction. The linkage kit has two ends, one end of the linkage kit is fixed to the latch module, and the other end of the linkage kit is slidably sleeved onto the lock base. The linkage kit is able to drive the lock base to make a rectilinear displacement, when the latch module is switched from the locked state to the unlocked state. When an anti-theft lock is locked to the lock base, the lock base limits the linkage kit to the rectilinear displacement, and the linkage kit limits the latch module in the locked state.

In another aspect, the present disclosure provides a detachable electronic device, which includes a first machine body, a second machine body, and a dock. The dock is configured to dock the first machine body with the second machine body. The dock includes a pair of fixing brackets, a pair of rotating axles, a latch module, a lock base, and a linkage kit. The pair of fixing brackets is each fixed to the first machine body. The pair of rotating axles is mounted on the pair of fixing brackets, and the pair of rotating axles are rotatable relative to the pair of fixing brackets about an axial direction. The latch module is disposed between the pair of rotating axles. The latch module is configured to lock the second machine body in a locked state, or to release the second machine body in an unlocked state. The latch module is able to rotate with respect to the pair of rotating axles. The lock base is slidably disposed on one of the pair of fixing brackets along the axial direction. The linkage kit has two ends. One end of the linkage kit is fixed to the latch module, and the other end of the linkage kit is slidably sleeved onto the lock base. When the latch module is moved from the locked state to the unlocked state, the linkage kit is able to drive the lock base to make a rectilinear displacement. When an anti-theft lock is locked to the lock base, the lock base limits the linkage kit to the rectilinear displacement, and the linkage kit restricts the latch module to the locked state.

Therefore, the dock of the electronic device provided by the present disclosure allows both of the first machine body and the second machine body to be anti-theft by use of one anti-theft lock. When the anti-theft lock is locked to the lock base, the lock base limits the linkage kit to the rectilinear displacement, and the linkage kit restricts the latch module to the locked state. Hence, a front end of the anti-theft lock will not push components of the dock, so as to prevent the front end of the anti-theft lock from being deformed. In this way, the service life of the anti-theft lock can be extended.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
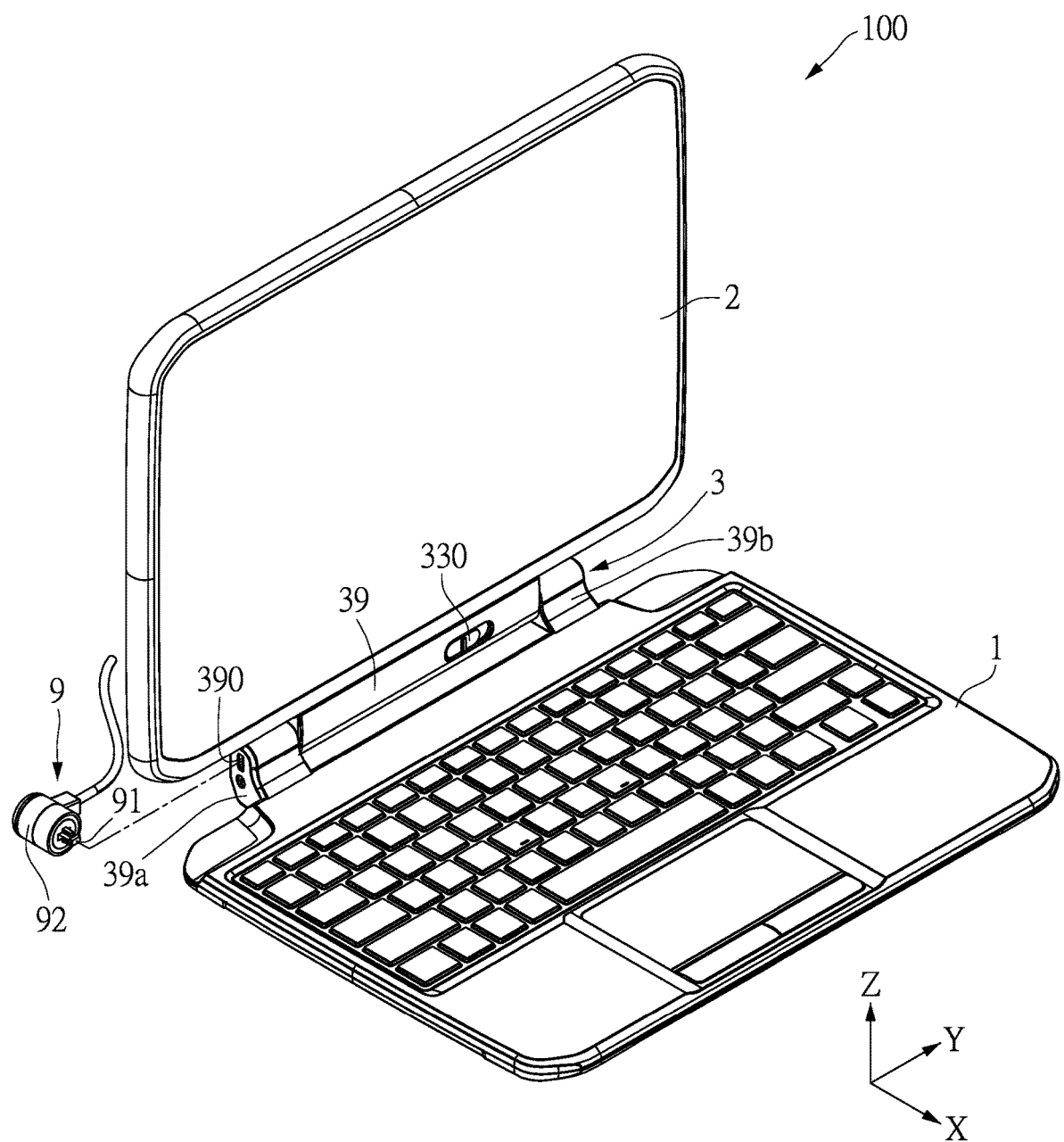
FIG. 1 is a perspective view of a detachable electronic device and an anti-theft lock according to the present disclosure.
Figure 5:
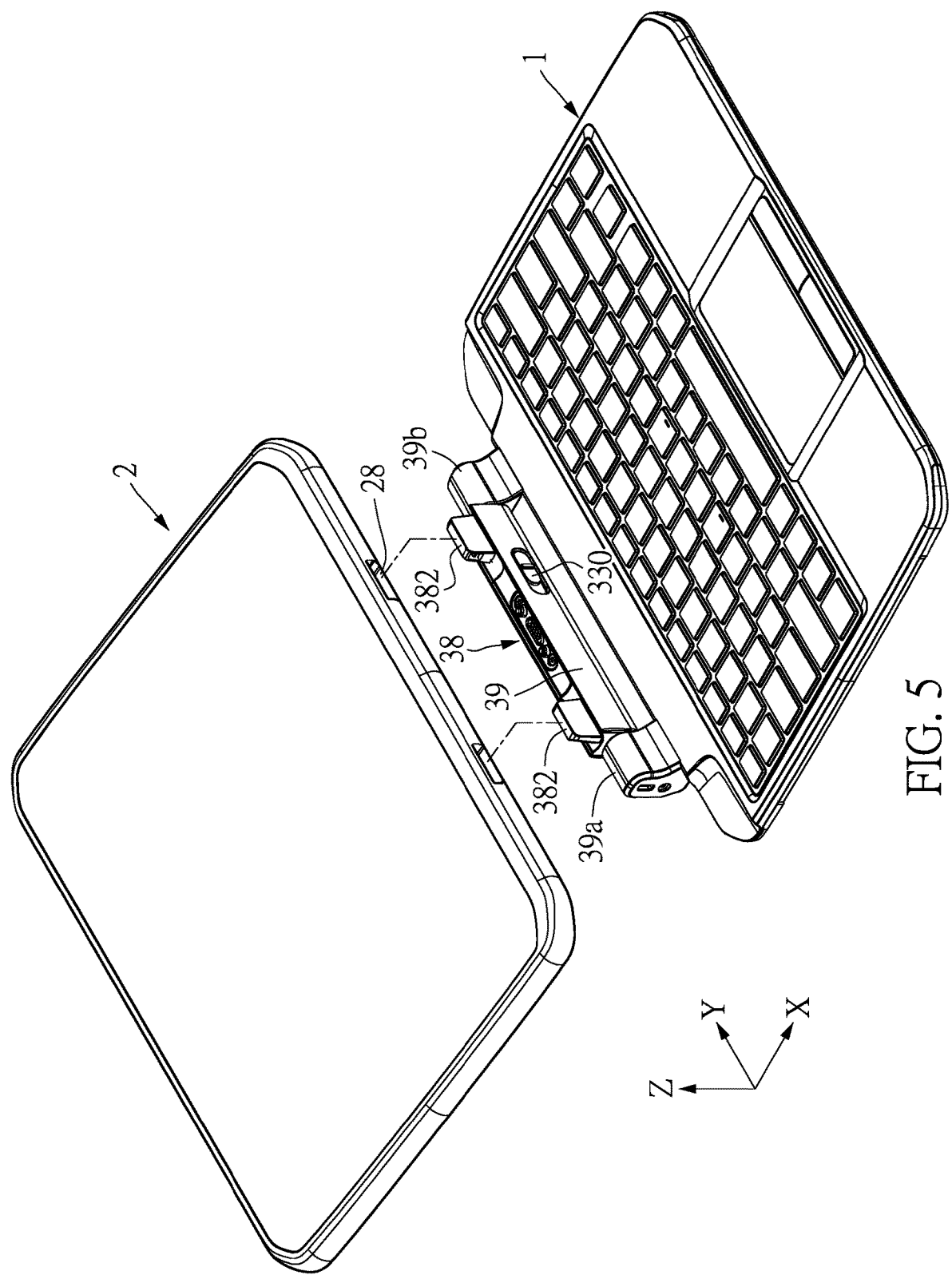
FIG. 5 is a perspective view showing a second machine body being detached from the first machine body according to the present disclosure.

Referring to FIG. 1 and FIG. 5, an embodiment of the present disclosure provides a detachable electronic device 100, which includes a first machine body 1, a second machine body 2, and a dock 3. The dock 3 is disposed on the first machine body 1. The dock 3 is used to dock the first machine body 1 with the second machine body 2. As shown in FIG. 5, the second machine body 2 is detachably connected to the first machine body 1 by the dock 3. The first machine body 1 may be, for example, an external keyboard, and the second machine body 2 may be, for example, a tablet computer. As shown in FIG. 1, the detachable electronic device 100 may work with an anti-theft lock 9 (e.g., a KENSINGTON® lock) which provides an anti-theft function. The anti-theft lock 9 includes a lock core 91 and a main body 92.

Figure 2:
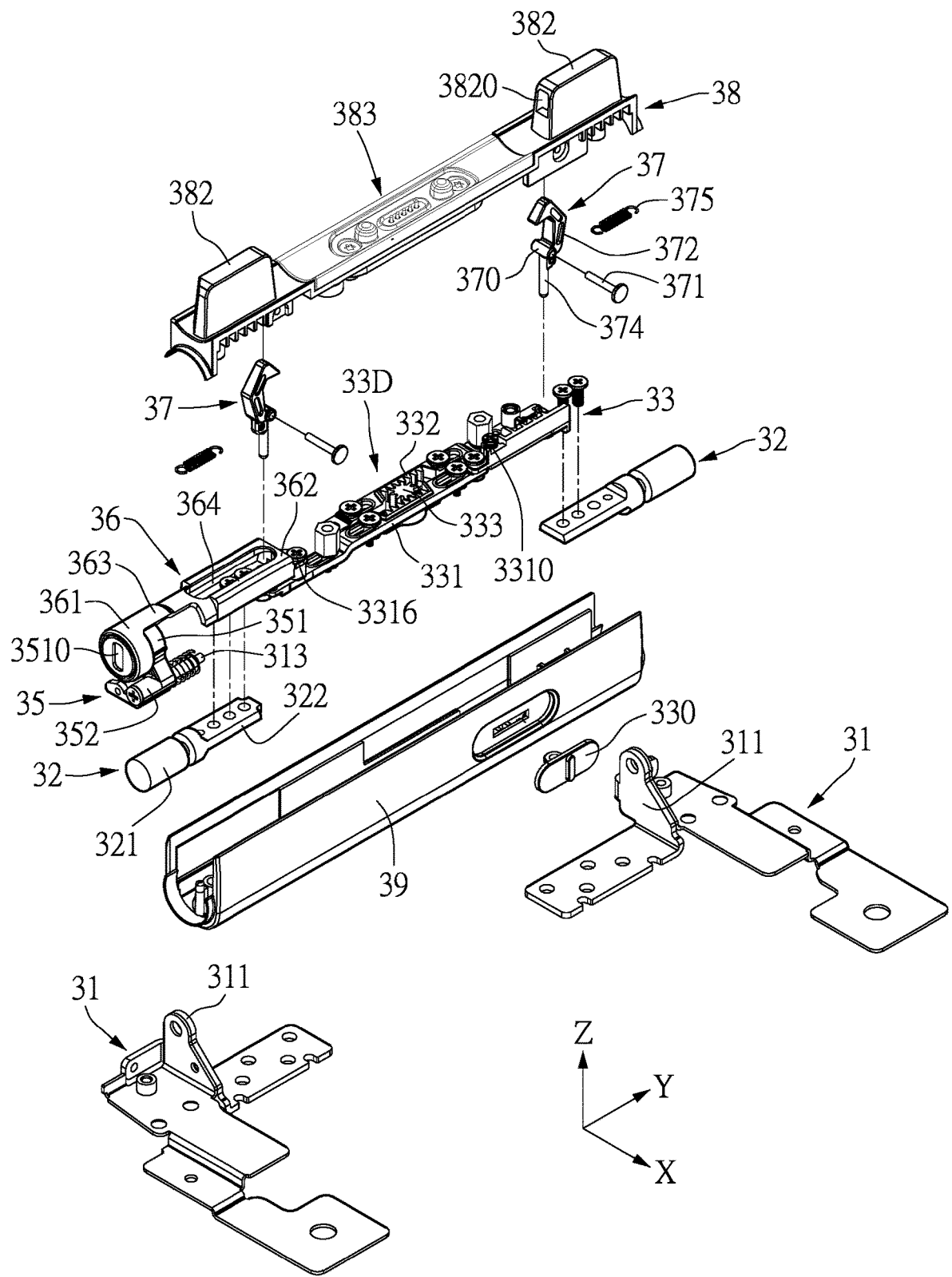
FIG. 2 is an exploded perspective view of a dock according to the present disclosure.
Figure 3:
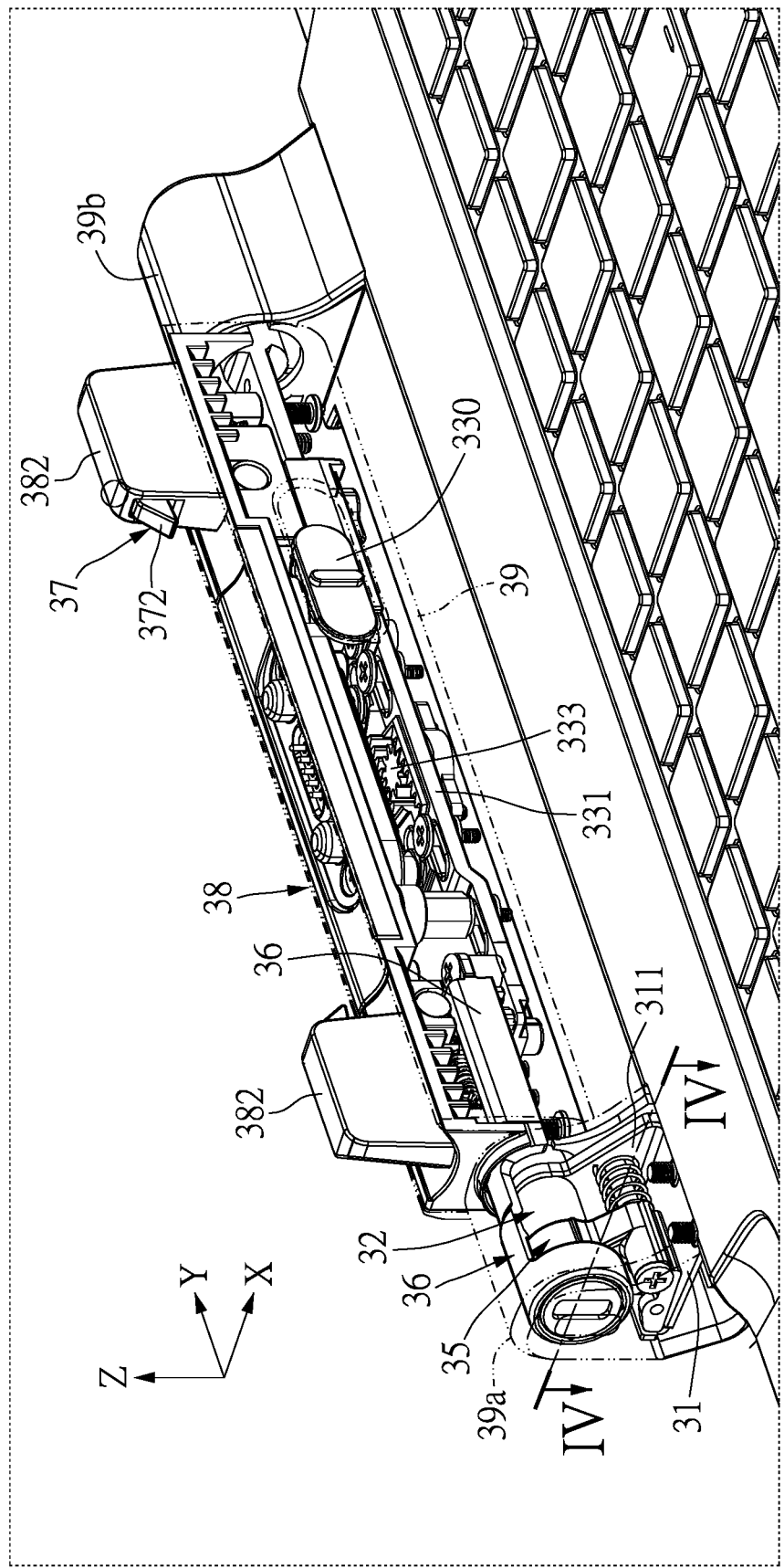
FIG. 3 is a perspective view showing a first machine body with the dock in a locked state according to the present disclosure.
Figure 4:
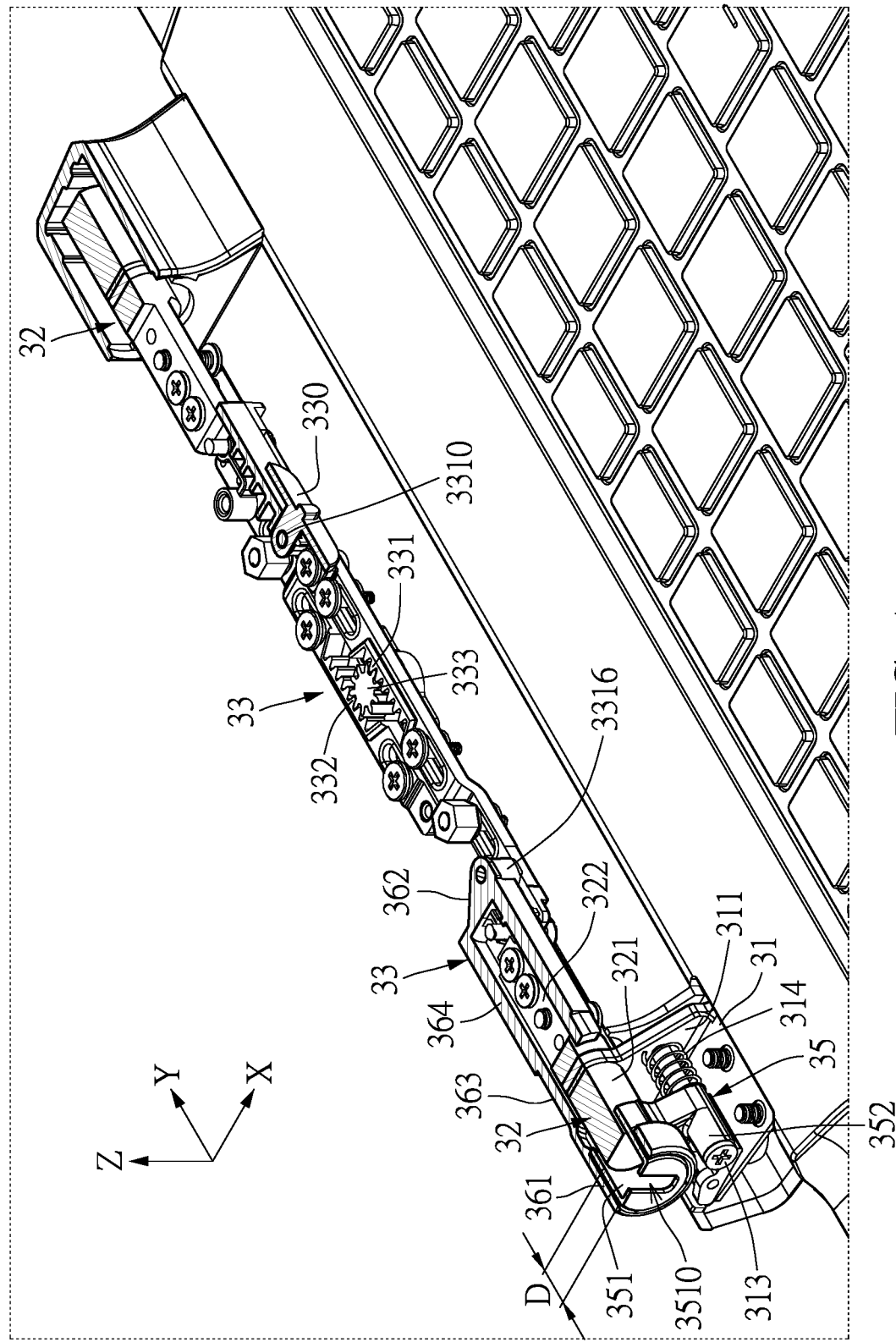
FIG. 4 is a perspective cross-sectional view of the dock of FIG. 3.

As shown in FIG. 2, the dock 3 includes a pair of fixing brackets 31, a pair of rotating axles 32, a latch module 33, a lock base 35 and a linkage kit 36. The pair of fixing brackets 31 is fixed to two respective sides of a top surface of the first machine body 1. As shown in FIG. 3 and FIG. 4, in this embodiment, one end (i.e., an inner end) of the linkage kit 36 is fixed to the latch module 33. The other end (i.e., an outer end) of the linkage kit 36 is slidably sleeved onto the lock base 35. Therefore, the linkage kit 36 can drive the lock base 35 to make a rectilinear displacement by an unlocking process (where the latch module 33 is moved from a locked state to an unlocked state). With the above-described structural arrangement, the main characteristic of the present embodiment and its advantages are as follows. When the anti-theft lock 9 (as shown in FIG. 1) is locked to the lock base 35, the lock base 35 limits the linkage kit 36 to the rectilinear displacement, and the linkage kit 36 limits the latch module 33 to the locked state. Accordingly, in the present embodiment, the anti-theft function is provided to both of the first machine body 1 and the second machine body 2 by the single anti-theft lock 9. Each element and connection relationships thereof will be described in detail below.

As shown in FIG. 2, the fixing brackets 31 of the dock 3 may be made by stamping a metal board. The bottom portion of each fixing bracket 31 is substantially L-shaped, and may be fixed to the first machine body 1 in a screwing manner. In this embodiment, each fixing bracket 31 is formed by two joint metal sheets, and the two metal sheets jointly form an erect wall 311. The erect wall 311 is connected and perpendicular to the fixing bracket 31. However, the fixing bracket of the present disclosure is not limited thereto, and may also be formed by stamping and bending single piece of metal plate. The dock 3 further includes an accommodation housing 39 and a pair of side covers 39a, 39b, so as to accommodate or cover the above-mentioned components.

In this embodiment, the pair of rotating axles 32 is disposed on the pair of fixing brackets 31. The rotating axles 32 are rotatable relative to the fixing brackets 31 about an axial direction (which is parallel to the Y-axis direction in FIG. 2). Each rotating axle 32 includes an outer axle 321 and an inner axle 322. The outer axle 321 is disposed at one side of the erect wall 311, and the inner axle 322 is disposed at the other side of the erect wall 311. The rotating axle 32 may be a pivot bearing of a conventional laptop computer. Therefore, the second machine body 2 may rotate relative to the first machine body 1 about the axial direction of the rotating axle 32, so as to adjust an inclined angle of the second machine body 2. Further, the second machine body 2 can be immediately fixed at the adjusted angle. In this embodiment, two respective ends of the accommodation housing 39 are fixed and screwed to the inner axles 322 of the rotating axles 32. The side covers 39a, 39b cover the pair of outer axles 321 of the pair of rotating axles 32. An outer keyhole 390 is formed on the side cover 39a (as shown in FIG. 1).

The latch module 33 is disposed between the pair of rotating axles 32. The second machine body 2 is locked by the latch module 33. When the latch module 33 is in the locked state, the second machine body 2 is fixed to the first machine body 1. When the latch module 33 is in the unlocked state, the second machine body 2 is detached from the first machine body 1 and be independently used. In this embodiment, the latch module 33 is movably disposed in the accommodation housing 39, and is used to hook the second machine body 2 to the dock 3. The latch module 33 will be described in detail later on.

Referring to FIG. 3 and FIG. 4, a detailed description of the lock base 35 is provided below. In this embodiment, the lock base 35 may be a metal casting part, so that the anti-theft lock 9 can be firmly locked thereon. Specifically, the lock base 35 of this embodiment has a spindle sleeve 351. The spindle sleeve 351 is substantially shaped in the form of a round cup. A lock slot 3510 is formed on an outer wall of the spindle sleeve 351. The lock slot 3510 corresponds in position and shape to the outer keyhole 390. The spindle sleeve 351 is sleeved onto an outer periphery of the outer axle 321 of the rotating axle 32. As shown in a cross-sectional view of FIG. 4, when the latch module 33 is in the locked state, a distance D is provided between the lock slot 3510 and the outer axle 321 for the spindle sleeve 351 to move.

In this embodiment, the lock base 35 is arranged to move rectilinearly (as described below). The lock base 35 is slidably disposed on one of the fixing brackets 31 (e.g., the left one of the fixing brackets 31 in FIG. 4). However, the present disclosure is not limited thereto. As shown in FIG.

4, the fixing bracket 31 further includes a limiting rod 313 and a spring 314. The limiting rod 313 is parallel to the axial direction, and is fixed to the erect wall 311 of the fixing bracket 31. In particular, the limiting rod 313 can be a screw or a bolt that is directly screwed to the erect wall 311. The lock base 35 further includes a limiting sleeve 352. The limiting sleeve 352 is disposed at one side of the spindle sleeve 351, and is movably sleeved on the limiting rod 313. In other words, the lock base 35 can move inward or outward on the limiting rod 313 through the limiting sleeve 352. The spring 314 is sleeved onto the limiting rod 313. Further, the spring 314 is disposed at the other side of the spindle sleeve 351 and is between the erect wall 311 and the spindle sleeve 351, so as to provide a restoring elastic force to the lock base 35. However, the present disclosure is not limited to the above-described limiting structure. In another embodiment, a limiting groove may be formed on a bottom portion of the lock base 35, and a protruding limiting rail may be formed on the fixing bracket 31, so that the lock base 35 can be slidably disposed on the limiting rail.

A detailed description of the linkage kit 36 is provided below. The outer end of the linkage kit 36 (which is away from the latch module 33) has a ferrule 361. The ferrule 361 is sleeved onto the outer periphery of the spindle sleeve 351 of the lock base 35. The inner end of the linkage kit 36 (which is close to the latch module 33) has a connecting portion 362. The connecting portion 362 is fixed to the latch module 33. By the connecting portion 362, the linkage kit 36 and the latch module 33 can move together. The linkage kit 36 further includes an extension arm 363 and a frame portion 364 between the ferrule 361 and the connecting portion 362. The extension arm 363 extends inwardly (that is, toward the latch module 33) from the inner part of the ferrule 361, and is connected to one end of the frame portion 364. The connecting portion 362 is located at the other end of the frame portion 364. The inner axle 322 is disposed in the frame portion 364, and the outer axle 321 is disposed at one side of the extension arm 363. The outer wall of the lock base 35 that has the lock slot 3510 formed thereon is fully exposed from an outer circular opening of the ferrule 361. The side cover 39a covers the ferrule 361 and the lock base 35, and the outer keyhole 390 is correspondingly formed on the side cover 39a.

Figure 9A:
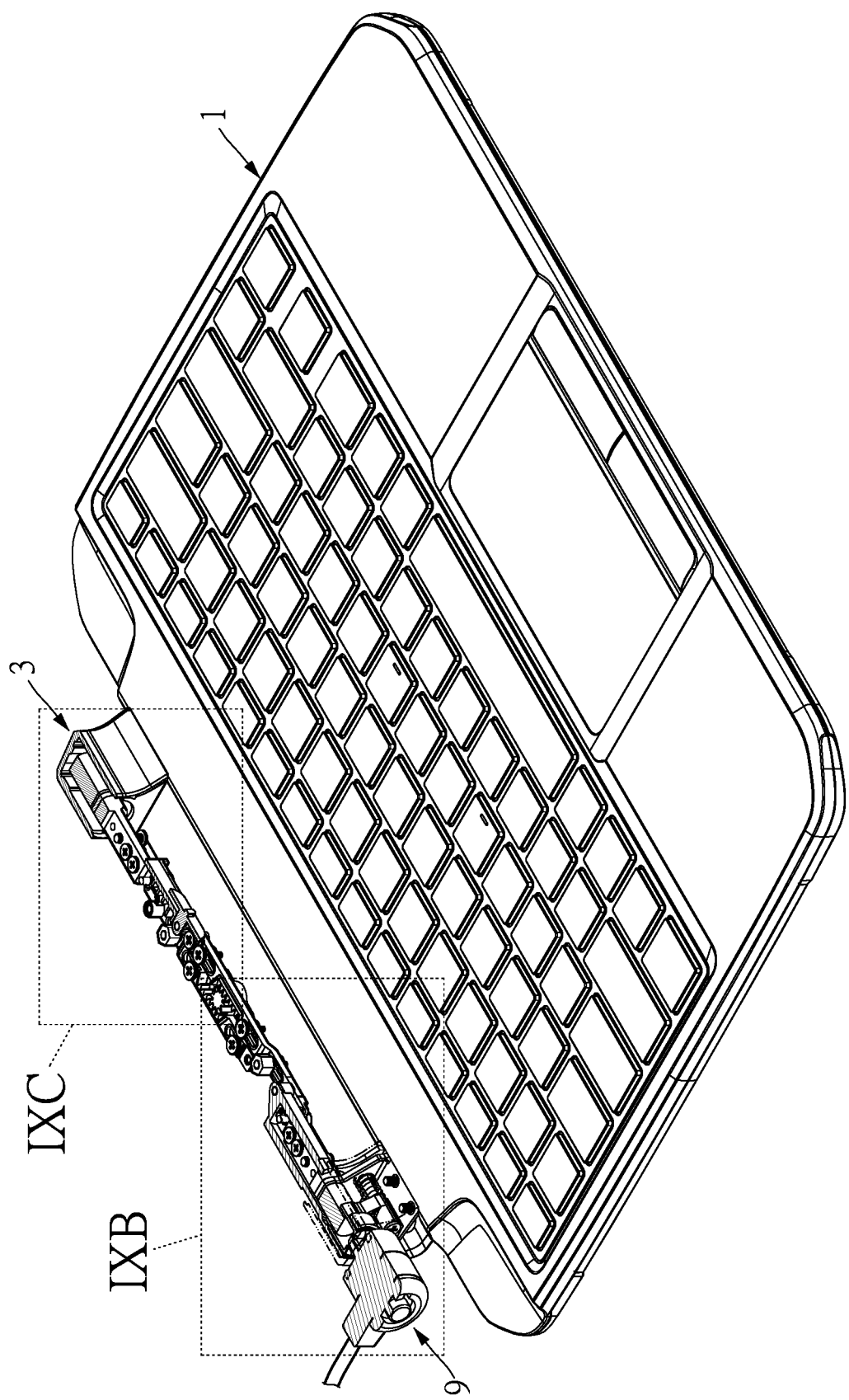
FIG. 9A is a perspective cross-sectional view of the dock of FIG. 8.
Figure 9B:
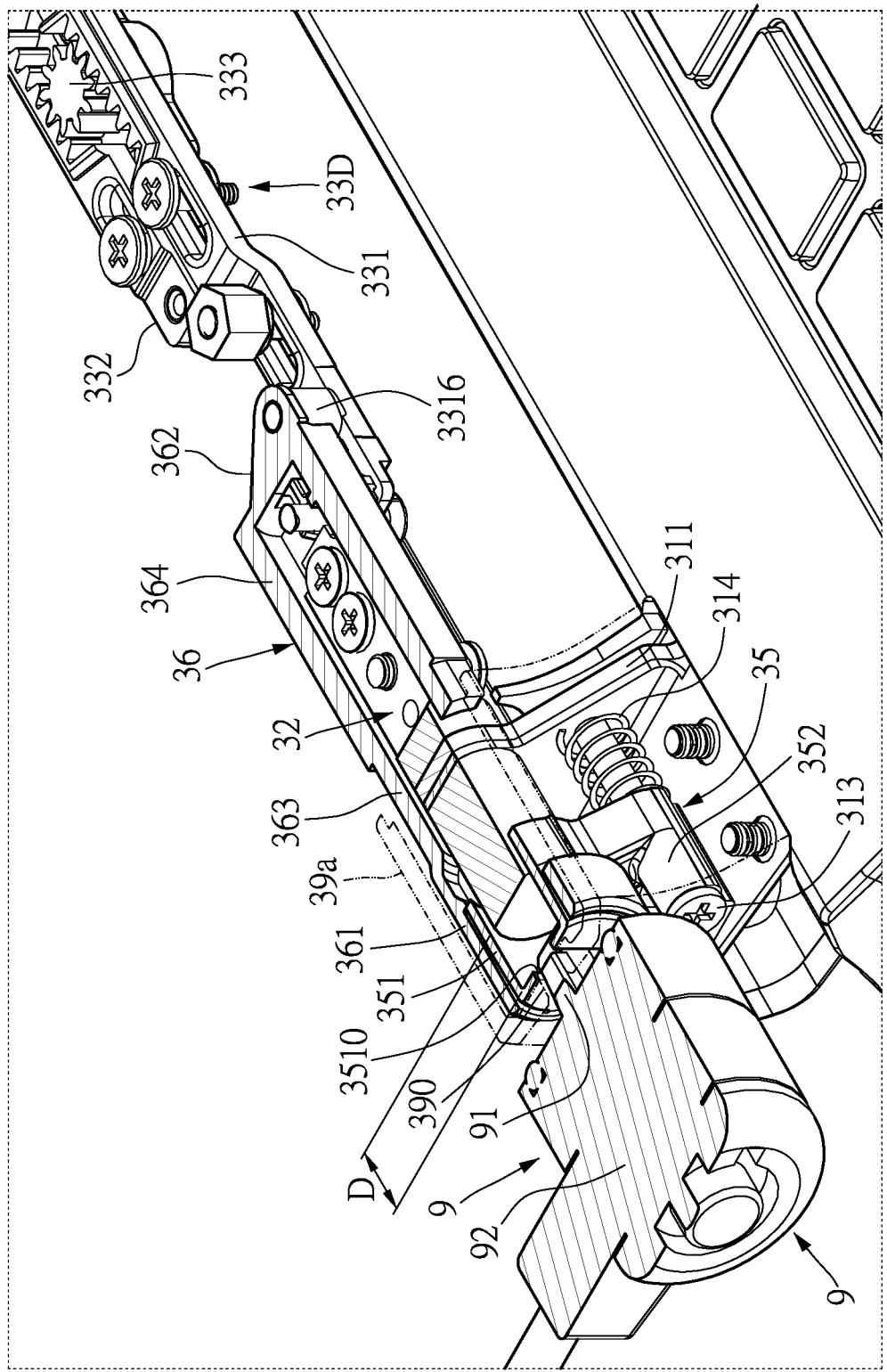
FIG. 9B is an enlarged view of "IXB" part of FIG. 9A.

As shown in FIG. 9A and FIG. 9B, when the anti-theft lock 9 is inserted into the lock slot 3510 of the lock base 35, the lock core 91 of the anti-theft lock 9 passes through the lock slot 3510, so as to limit a displacement of the lock base 35. In other words, the lock base 35 is held by the lock core 91 of the anti-theft lock 9 and cannot move. In addition, the ferrule 361 of the linkage kit 36 is sleeved onto the spindle sleeve 351 of the lock base 35, so that the lock base 35 further limits the linkage kit 36 to the rectilinear displacement. Under such conditions, since one end of the linkage kit 36 (i.e., an inner end of the extension arm 363) is fixed to the latch module 33, the linkage kit 36 also restricts the latch module 33 to the locked state. In the meantime, the second machine body 2 cannot be unlocked off the latch module 33, and is locked to the first machine body 1, thereby providing the electronic device 100 with the anti-theft function.

Figure 6:
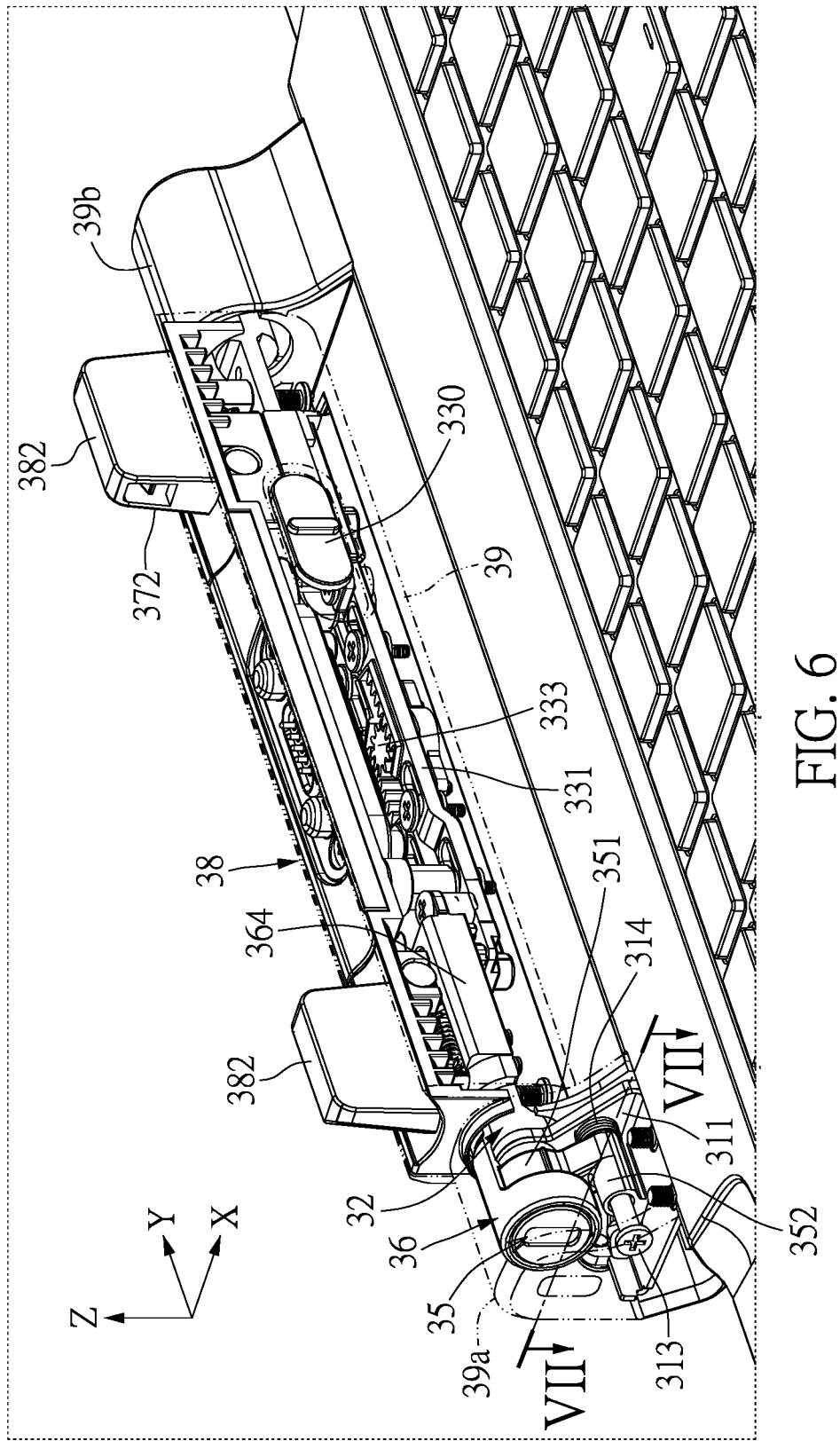
FIG. 6 is a perspective view showing the first machine body with the dock in an unlocked state according to the present disclosure.
Figure 7:
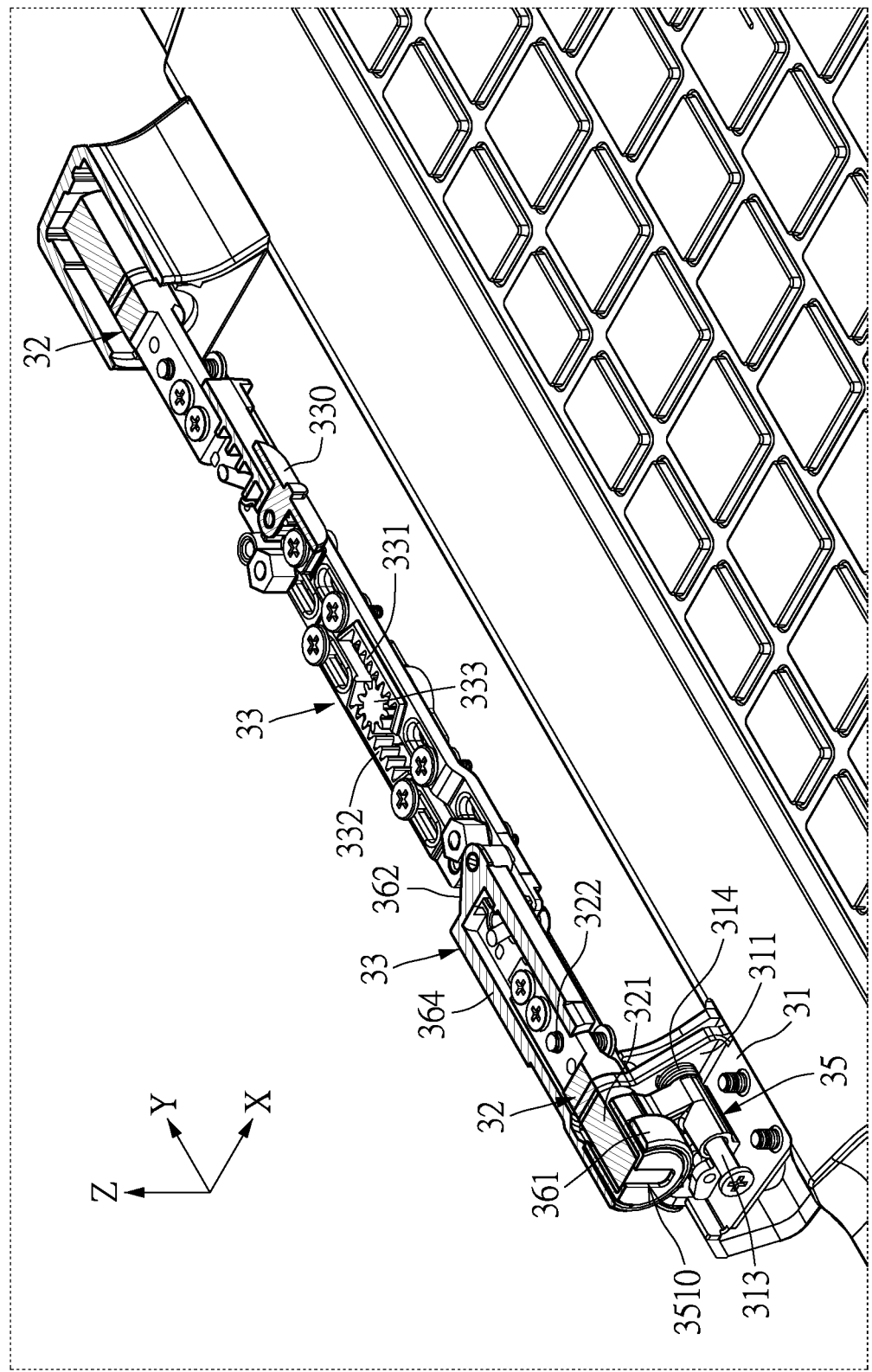
FIG. 7 is a perspective cross-sectional of the dock of FIG. 6.

Referring to FIG. 2, the structure of the latch module 33 in this embodiment will be described below. The latch module 33 includes a release button 330, a transmission assembly 33D, and a pair of hooks 37. The release button 330 can be movable and located at a locked position (as shown in FIG. 3, not being subject to any force) or a released position (as shown in FIG. 6, being forced to move toward a positive Y-axis direction), so as to drive the transmission assembly 33D. In particular, the release button 330 is slidably disposed on a front surface of the accommodation housing 39 close to the first machine body 1, and passes through the accommodation housing 39 to connect with the transmission assembly 33D. The transmission assembly 33D can drive the pair of hooks 37 to protrude outside the accommodation housing 39 in the locked state, or to retract into the accommodation housing 39 in the unlocked state. As shown in FIG. 3 and FIG. 9B, the linkage kit 36 is located at a first position that corresponds to the locked position, and the distance D is defined between the linkage kit 36 and the outer axle 321 of the rotating axle 32. As shown in FIG. 6 and FIG. 7, the linkage kit 36 is located at a second position that corresponds to the unlocked position, and the linkage kit 36 abuts the outer axle 321 of the rotating axle 32. When the release button 330 of the latch module 33 moves, the linkage kit 36 also moves inward (referring to the positive Y-axis direction in FIG. 6 and FIG. 7) until reaching a state as shown in FIG. 7. In the meantime, the lock base 35 is drawn inward by the ferrule 361 of the linkage kit 36.

It should be noted that the transmission assembly 33D is configured to drive the pair of hooks 37 in two ways. In the first way, the pair of hooks 37 can be driven to move in one direction to lock the second machine body 2 or in the other direction to unlock the second machine body 2. In the second way, the transmission assembly 33D can drive the pair of the hooks 37 to simultaneously move inward or outward, so as to lock or unlock the second machine body 2. In the present disclosure, any of the two ways can be used. The second way is used in the present embodiment, and will be described as follows.

Reference is made to FIG. 2. In addition to the release button 330, the transmission assembly 33D further includes a first rack 331, a second rack 332, and a relay gear 333. The relay gear 333 can rotate at a fixed position. In this embodiment, the relay gear 333 is disposed in the accommodation housing 39, and is substantially at a central position. The first rack 331 and the second rack 332 are parallel to each other and are disposed at two respective sides of the relay gear 333, and the relay gear 333 is engaged between the first rack 331 and the second rack 332. In detail, the first rack 331 and the second rack 332 are movably disposed on the accommodation housing 39 in a linear manner. The connecting portion 362 of the linkage kit 36 is fixed to a first end 3316 of the first rack 331. The release button 330 is fixed to a second end 3310 of the first rack 331 (as shown in FIG. 2 and FIG. 4). Through the above arrangement, the first rack 331 and the second rack 332 can make displacements in opposite directions. In other words, when the release button 330 moves right (the positive Y-axis direction in FIG. 2), the first rack 331 is driven by the release button 330 to move right (the positive Y-axis direction in FIG. 2), and the second rack 332 moves left through the relay gear 333.

As shown in FIG. 2, FIG. 3 and FIG. 5, the dock 3 of this embodiment further includes a mounting saddle 38. The mounting saddle 38 is disposed on the accommodation housing 39, and screwed to the inner axle 322 of the rotating axle 32. The mounting saddle 38 covers at least the latch module 33, so as to support the second machine body 2. The mounting saddle 38 has two tenons 382 and a connector 383. The tenon 382 on the left is substantially disposed above the frame portion 364. Each tenon 382 has a hook hole 3820 formed thereon, so as to expose the hook 37. The second machine body 2 has two mortises 28. The two tenons 382 correspond to the positions of the two mortises 28 of the second machine body 2. The connector 383 can be electrically connected to the first machine body 1. Each hook 37 has a pivot portion 370, a leg post 374, and a hooking portion 372. The hooking portion 372 is connected to an upper end of the pivot portion 370. The leg post 374 is connected to a lower end of the pivot portion 370. The pivot portion 370 is pivotally disposed in the mounting saddle 38 along a direction perpendicular to the axial direction. The two leg posts 374 are inserted in the first rack 331 and the second rack 332. In this embodiment, the pivot portion 370 has a pivot shaft 371 that is perpendicular to the axial direction, and the pivot portion 370 is pivotally disposed in the mounting saddle 38 through the pivot shaft 371. The two leg posts 374 are driven by the first rack 331 and the second rack 332, and the hook 37 can swing left or right about the pivot portion 370 as an axis. The hooking portion 372 is selectively protruded outside the mounting saddle 38 to lock the second machine body 2. In this embodiment, each hook 37 has a restoring spring 375 that is disposed under the pivot portion 370, so that the hook 37 can protrude outside the mounting saddle 38 when the release button 330 is not being pushed.

As shown in FIG. 1, FIG. 3 and FIG. 4, according to the electronic device 100 of the present disclosure, the second machine body 2 can be docked with the first machine body 1 by the dock 3. When the electronic device 100 is not connected with the anti-theft lock 9, the anti-theft lock 9 is not locked to the lock base 35. In other words, the lock core 91 of the anti-theft lock 9 is not in the spindle sleeve 351 of the lock base 35, and the lock base 35 is not fixed by the anti-theft lock 9.

As shown in FIG. 5 and FIG. 6, a user can push the release button 330 toward a right side (i.e., the positive Y-axis direction in the drawings), so as to reach the unlocked state. In the meantime, the linkage kit 36 can move right during the unlocking process of the release button 330, and the lock base 35 moves inward along with the linkage kit 36. In other words, the lock base 35 moves inward in a straight line along with the limiting rod 313, and compresses the spring 314. As shown in FIG. 5, the hook 37 retracts into the tenon 382, so that the second machine body 2 can be detached from the first machine body 1. When the user releases the release button 330, the lock base 35 and the linkage kit 36 are pushed outward to their original positions due to a restoring force of the spring 314, and the latch module 33 is simultaneously driven to the locked state (as shown in FIG. 1). In addition, the electronic device 100 can be connected to the anti-theft lock 9.

Figure 8:
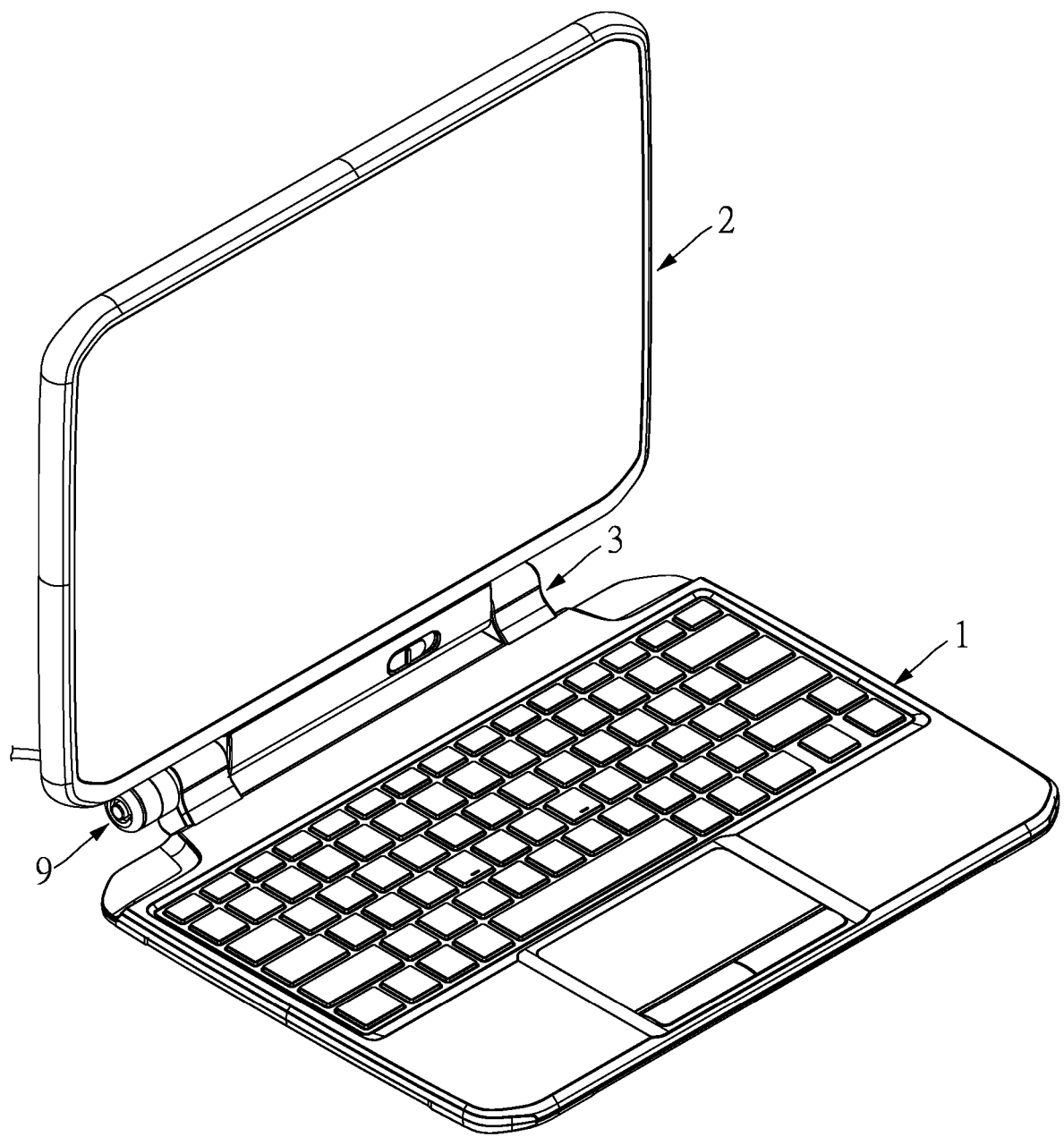
FIG. 8 is a perspective view showing the detachable electronic device locked by the anti-theft lock according to the present disclosure.
Figure 9C:
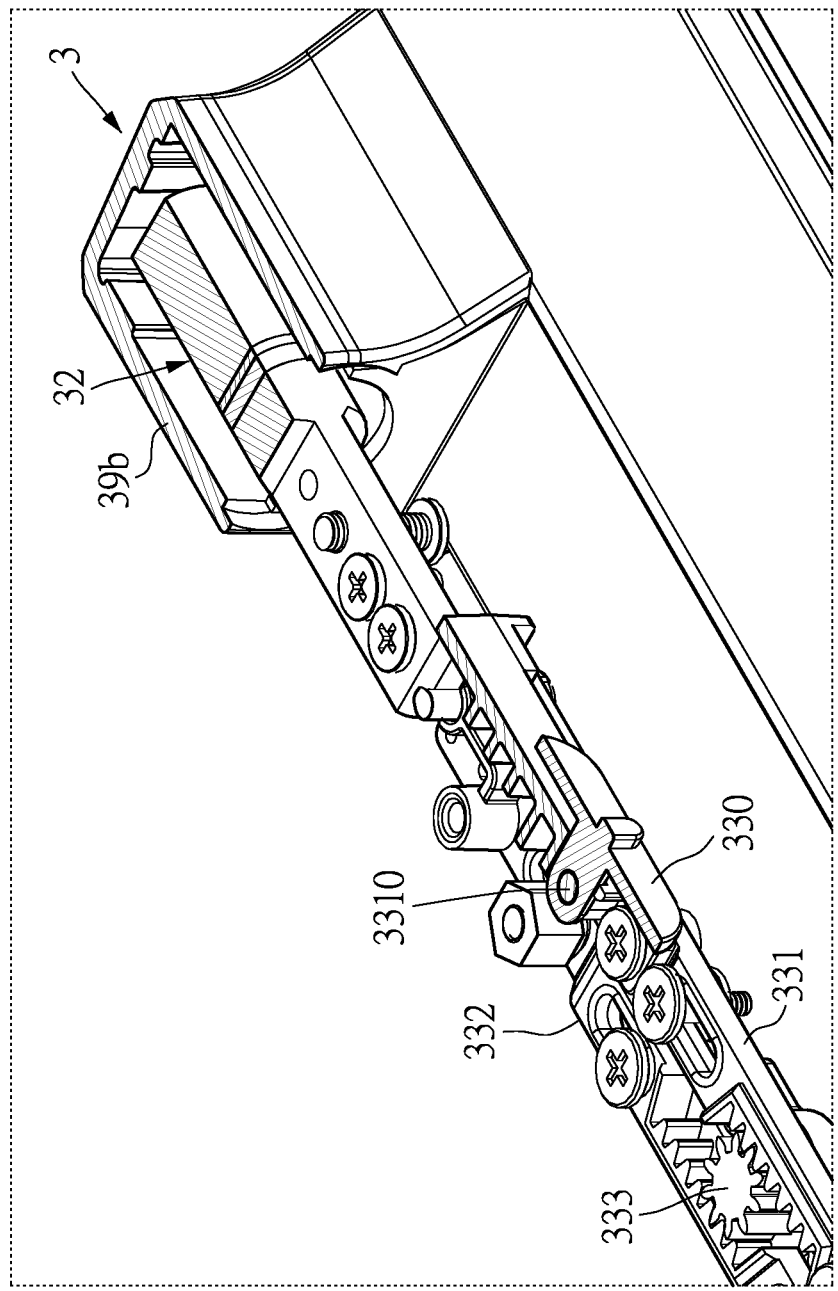
FIG. 9C is an enlarged view of "IXC" part of FIG. 9A.

Reference is made to FIG. 8 to FIG. 9C. When the anti-theft lock 9 is locked to the lock base 35, the lock base 35 restricts the linkage kit 36 to the first position (as shown in FIG. 9B), such that the linkage kit 36 is away from the rotating axle 32 by the distance D. In detail, the T-shaped lock core 91 of the anti-theft lock 9 passes through the outer keyhole 390 of the side cover 39a, and enters an interior of the spindle sleeve 351. After the anti-theft lock 9 is turned by a key, the T-shaped lock core 91 is perpendicular to the outer keyhole 390 and the lock slot 3510. In the meantime, the lock core 91 is located between the outer wall of the spindle sleeve 351 and the outer axle 321 of the rotating axle 32. The lock core 91 can hold the spindle sleeve 351 of the lock base 35, so that the spindle sleeve 351 is restricted between the side cover 39a and the main body 92 of the anti-theft lock 9. In other words, the spindle sleeve 351 is hooked by the lock core 91, thereby preventing the lock base 35 from moving. In the meantime, the displacement of the linkage kit 36 is also limited by the spindle sleeve 351 of the lock base 35, such that the linkage kit 36 cannot move. In addition, the linkage kit 36 also holds the first rack 331.

Accordingly, the release button 330 cannot move, and is restricted to the locked position (as shown in FIG. 8).

Figure 10:
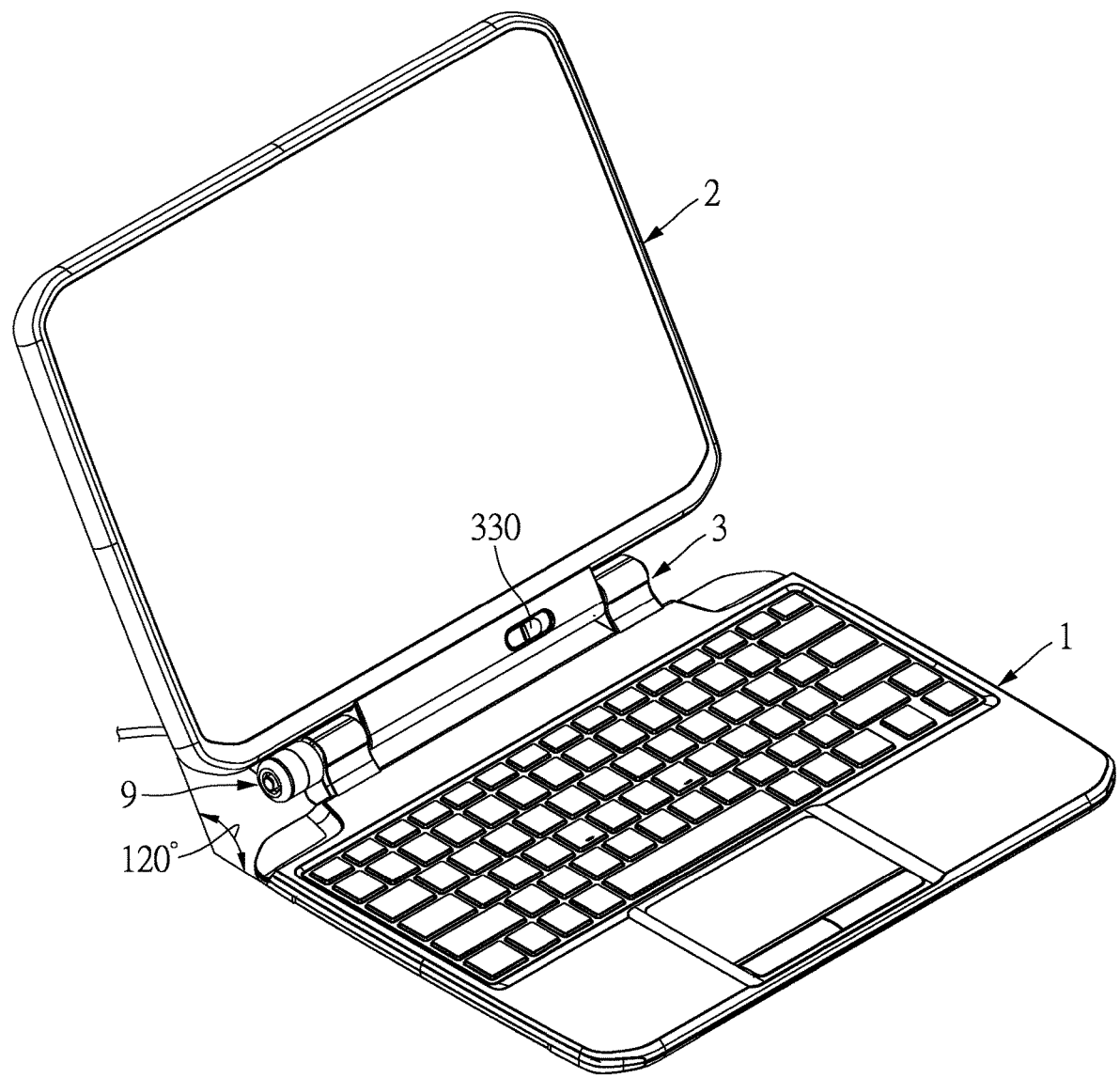
FIG. 10 is a perspective view showing the second machine body unfolded relative to the first machine body according to the present disclosure.
Figure 11:
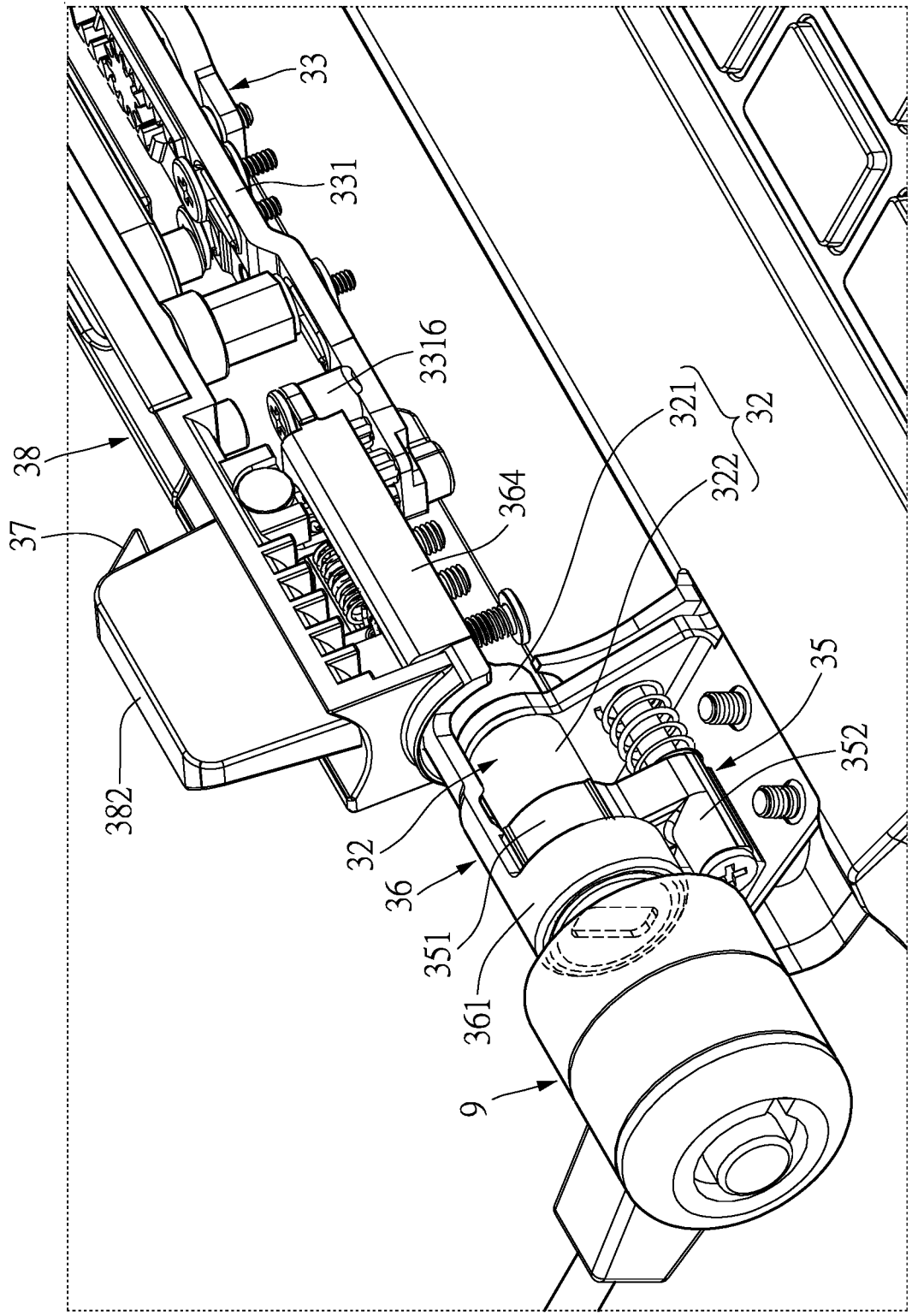
FIG. 11 is a schematic enlarged view of the dock of FIG. 10 (with the second machine body being hidden).

Reference is made to FIG. 10 and FIG. 11. When the electronic device 100 is secured by the anti-theft lock 9, the linkage kit 36 is still able to rotate relative to the lock base 35, so that the rotation angle of the second machine body 2 is not limited. For example, the second machine body 2 can be turned from 90 degrees (as shown in FIG. 8) to 120 degrees (as shown in FIG. 10) in a rearward direction away from the first machine body 1, and the linkage kit 36 is still able to rotate relative to the lock base 35. In detail, the ferrule 361 of the linkage kit 36 is rotatable relative to the spindle sleeve 351 of the lock base 35. The latch module 33 and the inner axle 322 of the rotating axle 32 can rotate correspondingly, and allow the second machine body 2 to be positioned at the adjusted angle.

However, the aforementioned details are disclosed for exemplary purposes only, and are not meant to limit the scope of the present disclosure.

Beneficial Effects of the Embodiment

In conclusion, the dock of the electronic device provided by the present disclosure provides anti-theft for both of the first machine body and the second machine body by use of single anti-theft lock. When the anti-theft lock is locked to the lock base, the lock base limits the linkage kit 36 to the rectilinear displacement, and the linkage kit restricts the latch module to the locked state. Therefore, a front end of the anti-theft lock will not push components of the dock, so as to prevent the front end of the anti-theft lock from being deformed. In this way, the service life of the anti-theft lock can be extended. In addition, when the electronic device 100 of the present disclosure is secured by the anti-theft lock 9, the linkage kit 36 is still rotatable relative to the lock base 35, so that a rotation angle of the second machine body 2 relative to the first machine body 1 is not limited.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dock, which is configured to dock a first machine body with a second machine body, the dock comprising:
    a pair of fixing brackets, wherein each one of the fixing brackets has a bottom portion, and the two bottom portions of the pair of fixing brackets are fixed to two respective sides of the first machine body;
    a pair of rotating axles being mounted on the respective fixing brackets, wherein the pair of rotating axles are rotatable relative to the pair of fixing brackets about an axial direction, and each of the rotating axles includes an outer axle and an inner axle;
    a latch module disposed between the pair of rotating axles, wherein the latch module is configured to lock the second machine body in a locked state or to release the second machine body in an unlocked state, and the latch module rotates with respect to the pair of rotating axles;

a lock base disposed on one of the fixing brackets and being capable of sliding along the axial direction; and a linkage kit having two ends, wherein one end of the linkage kit is fixed to the latch module while the other end of the linkage kit is slidably sleeved onto the lock base; wherein, when the latch module is switched from the locked state to the unlocked state, the linkage kit drives the lock base to make a rectilinear displacement;

wherein, when an anti-theftlock is locked to the lock base, the lock base limits the linkage kit to the rectilinear displacement, and the linkage kit restricts the latch module to be in the locked state;

wherein the lock base includes a spindle sleeve, the spindle sleeve is sleeved onto the outer axle, the linkage kit includes a ferrule, and the linkage kit is sleeved onto the spindle sleeve.

2. The dock according to claim 1, wherein each of the fixing brackets has an erect wall, the outer axle is disposed at one side of the erect wall, and the inner axle is disposed at another side of the erect wall.

3. The dock according to claim 2, wherein one of the fixing brackets further comprises a limiting rod and a spring, and the limiting rod is parallel to the axial direction and is fixed to the erect wall of the fixing brackets; wherein the lock base further comprises a limiting sleeve, the limiting sleeve is disposed at one side of the spindle sleeve and is movably sleeved onto the limiting rod, the spring is disposed at another side of the spindle sleeve and is located between the erect wall and the spindle sleeve, and the spring is sleeved onto the limiting rod.

4. The dock according to claim 1, wherein the latch module includes a release button, a transmission assembly, and a pair of hooks, the release button is capable of moving between a locked position or a released position, the release button drives the pair of hooks through the transmission assembly, the transmission assembly drives the pair of hooks to operate in the locked state or the unlocked state, and the linkage kit is arranged in a first position that corresponds to the locked position or in a second position that corresponds to the released position; wherein the linkage kit and the rotating axles are spaced apart from each other by a distance when the linkage kit is arranged in the first position, and the linkage kit abuts the rotating axles when the linkage kit is arranged in the second position;

wherein, when the anti-theft lock is locked to the lock base, the lock base restricts the linkage kit to the first position;

wherein, when the anti-theft lock is not locked to the lock base, the linkage kit moves with the lock base from the first position to the second position through a movement of the release button.

5. The dock according to claim 4, wherein the transmission assembly comprises a first rack, a second rack, and a relay gear, the first rack and the second rack are parallel to each other and are disposed at two respective sides of the relay gear, and the relay gear is engaged between the first rack and the second rack.

6. The dock according to claim 5, wherein the one end of the linkage kit is fixed to the first rack, and the release button is fixed to the first rack.

7. The dock according to claim 4, further comprising a saddle, wherein the mounting saddle at least covers the latch module, each one of the pair of hooks has a pivot portion, a leg post, and a hooking portion, the hooking portion is connected to an upper end of the pivot portion, the leg post is connected to a lower end of the pivot portion, the pivot portion is pivotally disposed in the mounting saddle along a direction perpendicular to the axial direction, the two respective leg posts of the pair of hooks are inserted in the first rack and the second rack, and the hooking portion selectively protrudes outside the mounting saddle.

8. A detachable electronic device, comprising:
a first machine body;
a second machine body; and
a dock being configured to dock the first machine body with the second machine body, wherein the dock comprises:
a pair of fixing brackets being fixed to the first machine body;
a pair of rotating axles being mounted on the respective fixing brackets, wherein the pair of rotating axles are rotatable relative to the pair of fixing brackets about an axial direction, and each of the rotating axles includes an outer axle and an inner axle;
a latch module disposed between the pair of rotating axles, wherein the latch module is configured to lock the second machine body in a locked state or to release the second machine body in an unlocked state, and the latch module rotates with respect to the pair of rotating axles;
a lock base disposed on one of the pair of fixing brackets and being capable of sliding along the axial direction; and
a linkage kit having two ends, wherein one end of the linkage kit is fixed to the latch module while the other end of the linkage kit is slidably sleeved onto the lock base; wherein, when the latch module is switched from the locked state to the unlocked state, the linkage kit drives the lock base to make rectilinear displacement;
wherein, when an anti-theft lock is locked to the lock base, the lock base limits the linkage kit to the rectilinear displacement, and the linkage kit restricts the latch module to the locked state;
wherein the lock base includes a spindle sleeve, the spindle sleeve is sleeved onto the outer axle, the linkage kit includes a ferrule, and the linkage kit is sleeved onto the spindle sleeve.

\* \* \* \* \*